United States Patent
Sato et al.

(10) Patent No.: US 12,549,835 B2
(45) Date of Patent: Feb. 10, 2026

(54) MAPPING DEVICE AND SUBSTRATE ACCOMMODATION STATE DETERMINATION METHOD

(71) Applicant: Sinfonia Technology Co., Ltd., Tokyo (JP)

(72) Inventors: Keigo Sato, Tokyo (JP); Yuji Miyashita, Tokyo (JP); Katsumi Yasuda, Tokyo (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 31 days.

(21) Appl. No.: 18/381,117

(22) Filed: Oct. 17, 2023

(65) Prior Publication Data

US 2024/0137628 A1 Apr. 25, 2024
US 2024/0236450 A9 Jul. 11, 2024

(30) Foreign Application Priority Data

Oct. 19, 2022 (JP) ................................. 2022-167635

(51) Int. Cl.
*H04N 23/45* (2023.01)
*G06T 7/00* (2017.01)
*H01L 21/67* (2006.01)

(52) U.S. Cl.
CPC ........... *H04N 23/45* (2023.01); *G06T 7/0004* (2013.01); *H01L 21/67265* (2013.01); *G06T 2207/30148* (2013.01)

(58) Field of Classification Search
CPC .................. H04N 23/45; G06T 7/0004; G06T 2207/30148; H01L 21/67265
See application file for complete search history.

(56) References Cited

U.S. PATENT DOCUMENTS

| | | | | |
|---|---|---|---|---|
| 6,082,951 A | * | 7/2000 | Nering | H01L 21/67772 414/416.03 |
| 2019/0067057 A1 | * | 2/2019 | Hu | H01L 21/67265 |
| 2021/0334949 A1 | * | 10/2021 | Abe | G06T 7/70 |
| 2023/0253229 A1 | * | 8/2023 | Tamatsukuri | H01L 21/67772 414/217 |
| 2024/0128104 A1 | * | 4/2024 | Shin | H01L 21/67288 |
| 2024/0416450 A1 | * | 12/2024 | Hisano | B23K 26/53 |

FOREIGN PATENT DOCUMENTS

| | | | |
|---|---|---|---|
| JP | 2019102753 A | * | 6/2019 |
| JP | 2021128995 | * | 9/2021 |
| JP | 7073697 B2 | | 5/2022 |

* cited by examiner

*Primary Examiner* — James T Boylan
(74) *Attorney, Agent, or Firm* — Kilpatrick Townsend & Stockton LLP

(57) ABSTRACT

The load port includes a FOUP configured to accommodate a plurality of substrates in multiple stages, cameras configured to image each of the substrates accommodated in the FOUP and including a low-magnification camera with a wide horizontal angle of view and a high-magnification camera with a narrow horizontal angle of view, and a CPU configured to detect the accommodation state of each of the substrates based on the imaging data acquired from the low-magnification camera and the high-magnification camera, respectively.

7 Claims, 9 Drawing Sheets

FIG. 3
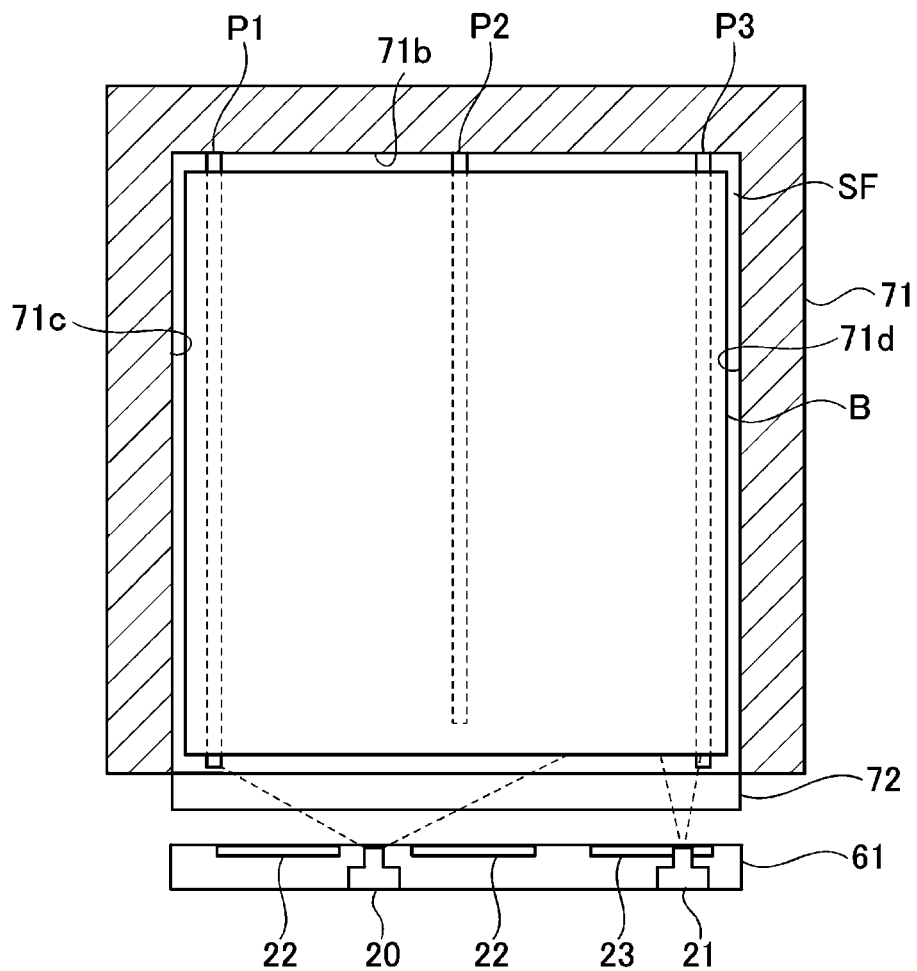
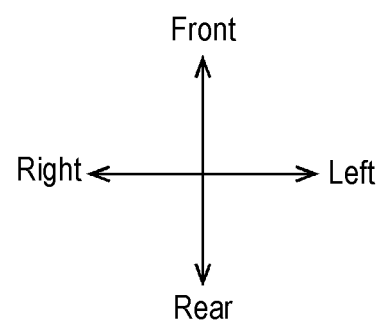

FIG. 7A
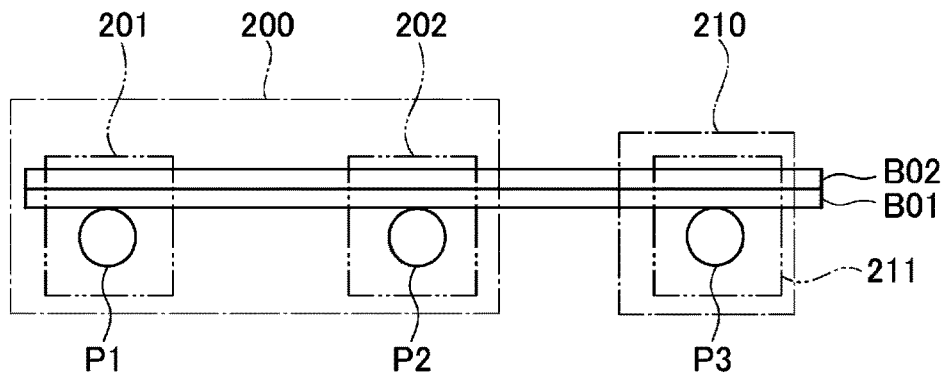
FIG. 7B
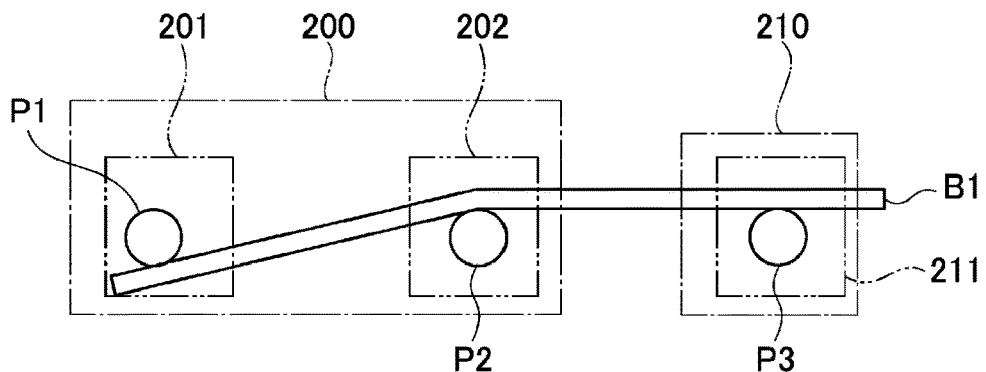
FIG. 7C
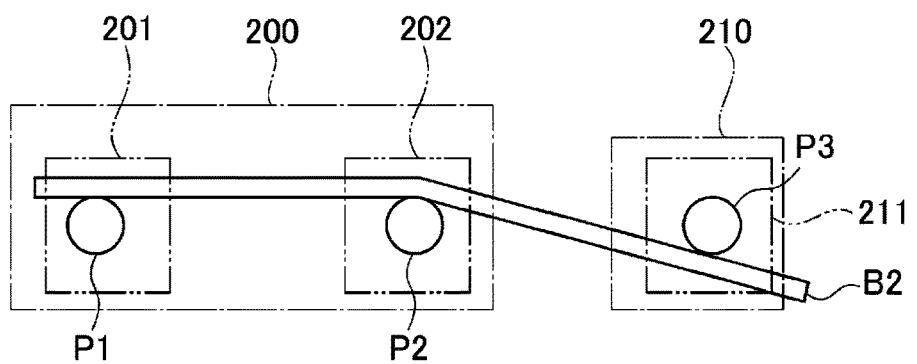
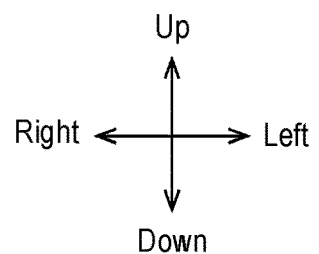

FIG. 8

MAPPING DEVICE AND SUBSTRATE ACCOMMODATION STATE DETERMINATION METHOD

CROSS-REFERENCE TO RELATED APPLICATION

This application is based upon and claims the benefit of priority from Japanese Patent Application No. 2022-167635, filed on Oct. 19, 2022, the entire contents of which are incorporated herein by reference.

TECHNICAL FIELD

The present disclosure relates to a technique for detecting an accommodation state of substrates accommodated in a container.

BACKGROUND

Patent Document 1 discloses a load port including a mapping sensor provided integrally with a door that moves up and down between a closed position for closing an opening communicating with a container in which a plurality of substrates are accommodated in multiple stages and an open position for opening the opening, and configured to detect a state of the substrate accommodated in each stage inside the container, wherein the mapping sensor includes a light emitting part that emits imaging light toward the substrate, and an imaging part that captures an image of an illumination region illuminated by the light emitting part.

PRIOR ART DOCUMENTS

Patent Documents

Patent Document 1: Japanese Patent No. 7073697

Patent Document 1 describing the load port does not mention the thickness of the substrate to be detected. However, it is necessary to detect the thickness of a substrate when detecting the accommodation state of a substrate having a thickness of, for example, about 0.2 mm, especially when detecting two substrates accommodated in an overlapping state in one stage of a container (hereinafter referred to as "doubled state"). In this case, it is necessary to increase the imaging magnification in order to detect a thin substrate as in the example.

However, when the imaging magnification is increased, the (horizontal) angle of view becomes narrower, making it impossible to image the entire substrate. Therefore, it may be difficult to detect that a portion of the substrate is accommodated in another stage (hereinafter referred to as "crossed state"). Further, in the case of detecting the doubled state and the crossed state with one imaging part without increasing the imaging magnification, it is necessary to prepare a high-resolution imaging part. For example, in order to detect that substrates having a thickness of 0.2 mm is in a doubled state, a resolution that is high enough to capture a region of less than 0.2 mm per pixel is required.

Therefore, in order to detect the doubled state and the crossed state with one mapping sensor as in the load port described in Patent Document 1, it is necessary to use a mapping sensor that includes an imaging part having a resolution high enough to image the entire substrate and distinguish between a doubled state and a normal state. Therefore, the manufacturing cost of the entire load port increases.

SUMMARY

The present disclosure provides a technique capable of detecting both a doubled state and a crossed state while reducing manufacturing costs.

According to one aspect of the present disclosure, there is provided a mapping device including: a container configured to accommodate a plurality of substrates in multiple stages; an imaging device configured to image each of the substrates accommodated in the container, the imaging device including a first imaging device and a second imaging device having a narrower horizontal angle of view and higher magnification than the first imaging device; and a controller configured to detect an accommodation state of each of the substrates based on first imaging data and second imaging data acquired from the first imaging device and the second imaging device, respectively.

Since an imaging device with a particularly large number of pixels is not used, it is possible to detect accommodation states, i.e., a doubled state and a crossed state while reducing manufacturing costs.

Further, the imaging device may be provided on a door that moves up and down over an opening of the container from a fully closed state to a fully open state.

Since the imaging device can be moved up and down in response to the raising and lowering operations of opening and closing the door, there is no need to provide a dedicated device for moving the imaging device up and down. Therefore, it is possible to further reduce the manufacturing cost of the entire mapping device.

Further, the container may have a plurality of poles provided in each stage and configured to support each of the substrates in each stage by the plurality of poles, and the imaging device may have a horizontal angle of view capable of imaging the plurality of poles.

Since the imaging device can image the entire substrate of each stage supported by the plurality of poles, it is possible to accurately detect accommodation states, i.e., a doubled state and a crossed state.

Further, the first imaging device may be configured to image a vicinity of the plurality of poles except for one pole located at an outermost position, and the second imaging device may be configured to image a vicinity of the one pole located at the outermost position.

Since an inexpensive imaging device with a narrow horizontal angle of view and a high magnification can be used as the second imaging device, it is possible to further reduce the manufacturing cost of the entire mapping device.

According to another aspect of the present disclosure, there is provided a substrate accommodation state determination method in which a substrate accommodated in a container is imaged by a first imaging device and a second imaging device to determine an accommodation state of the substrate, the first imaging device configured to image a first region, the second imaging device configured to image a second region narrower than the first region at a higher magnification than the first imaging device, the method including: a first state detection step of detecting a crossed state of the substrate existing in the first region based on a data acquired by the first imaging device; a second state detection step of detecting a crossed state of the substrate existing in the second region and the thickness of the substrate based on a data acquired by the second imaging device; and an accommodation state determination step of determining an accommodation state of the substrate based on the detection results of the first state detection step and the second state detection step.

Since an imaging device with a particularly large number of pixels is not used, it is possible to detect accommodation states, i.e., a doubled state and a crossed state while reducing manufacturing costs.

BRIEF DESCRIPTION OF DRAWINGS

The accompanying drawings, which are incorporated in and constitute a part of the specification, illustrate embodiments of the present disclosure.

FIG. 3 is a view showing an example of the positional relationship between cameras, illumination lights, and substrates to be imaged in FIG. 1.

FIGS. 7A, 7B and 7C are diagrams for explaining how the substrate accommodation state is determined by the substrate accommodation state determination process of FIG. 5.

FIG. 8 is a view showing an example of various accommodation states of the substrate and determined accommodation abnormalities.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Embodiments of the present disclosure will now be described in detail with reference to the drawings.

Figure 1:
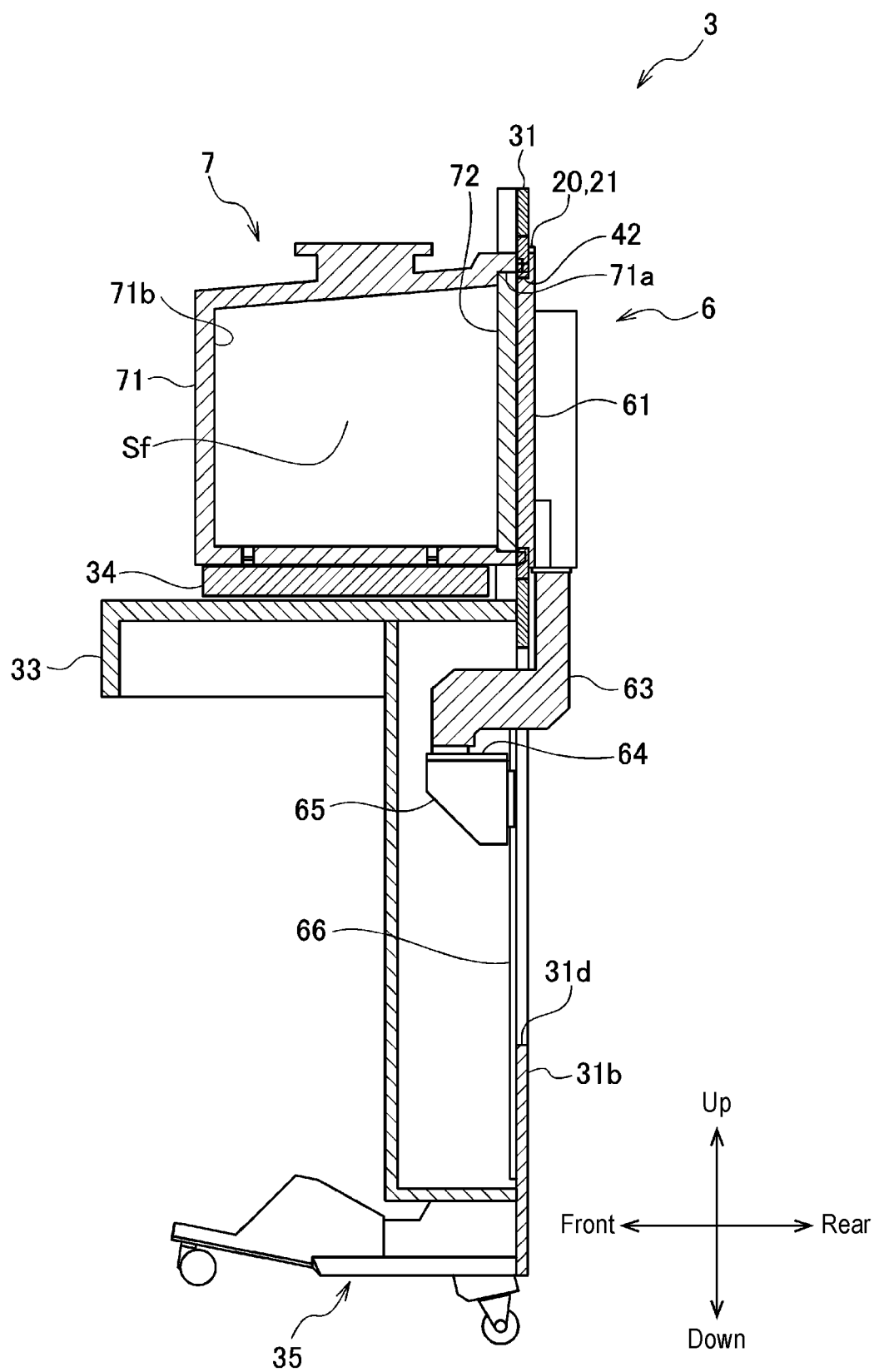
FIG. 1 is a side sectional view of a load port according to an embodiment of the present disclosure.

FIG. 1 shows a side cross section of a load port 3 (an example of a "mapping device") according to an embodiment of the present disclosure. The load port 3 is used by being assembled into a semiconductor manufacturing apparatus (not shown) that performs various processes on a substrate (in this embodiment, a square substrate). The load port serves as an interface between an FOUP (Front-Opening Unified Pod) 7 that accommodates a plurality of substrates and a semiconductor manufacturing apparatus. In each figure, when referring to a direction, the directions of arrows shown in each figure are used.

The load port 3 includes a panel 31 erected substantially vertically from the rear side of a leg 35 to which casters and installation legs are attached, and a horizontal base 33 extending forward from a position of about 60% of the height of the panel 31. A mounting table 34 for mounting the FOUP 7 is provided above the horizontal base 33.

The FOUP 7 is composed of a main body 71 having an internal space Sf for accommodating substrates, and a lid 72 capable of closing an opening 71a provided on one surface of the main body 71 and configured to serve as a loading/unloading port for the substrates. When the FOUP 7 is correctly mounted on the mounting table 34, the lid 72 faces the panel 31. The mounting table 34 can be moved in the front-rear direction with the FOUP 7 mounted thereon.

The load port 3 includes an opening/closing mechanism 6 for opening and closing the opening 42. The opening/closing mechanism 6 includes a door 61 for opening and closing the opening 42, a support frame 63 for supporting the door 61, a movable block 65 configured to support the support frame 63 via a slide support means 64 so as to be movable in the front-rear direction, and a slide rail 66 configured to support the movable block 65 so as to be movable in the vertical direction relative to the panel main body 31b. The support frame 63 supports the rear lower portion of the door 61, and has a substantially crank-like shape in which the support frame 63 extend downward, passes through a slit-shaped insertion hole 31d provided in the panel main body 31b and protrudes to the front of the panel main body 31b. The slide support means 64 for supporting the support frame 63, the movable block 65, and the slide rail 66 are provided in front of the panel main body 31b.

Furthermore, actuators 5 (see FIG. 4) for moving the door 61 in the front-rear direction and in the vertical direction are provided for the respective directions. By giving drive commands to the actuators 5 from the controller 11, the door 61 can be moved in the front-rear direction and the vertical direction.

The door 61 includes a connecting means (not shown) for performing a latch operation to open and close the lid 72 of the FOUP 7 and for holding the lid 72. With this connecting means, by operating the latch of the lid 72, the lid 72 can be made openable, and the lid 72 can be connected to the door 61 so as to be in an integrated state. Conversely, the lid 72 and the door 61 can be disconnected from each other, and the lid 72 can be attached to the main body 71 so as to be in a closed state.

Furthermore, by operating the connecting means, the lid 72 can be removed from the main body 71 while maintaining the connection between the lid 72 and the door 61, and the lid 72 can be integrally held by the door 61. In this state, the door 61 is moved rearward together with the support frame 63. By doing so, the lid 72 of the FOUP 7 can be separated from the main body 71 to open the internal space Sf.

Figure 2:
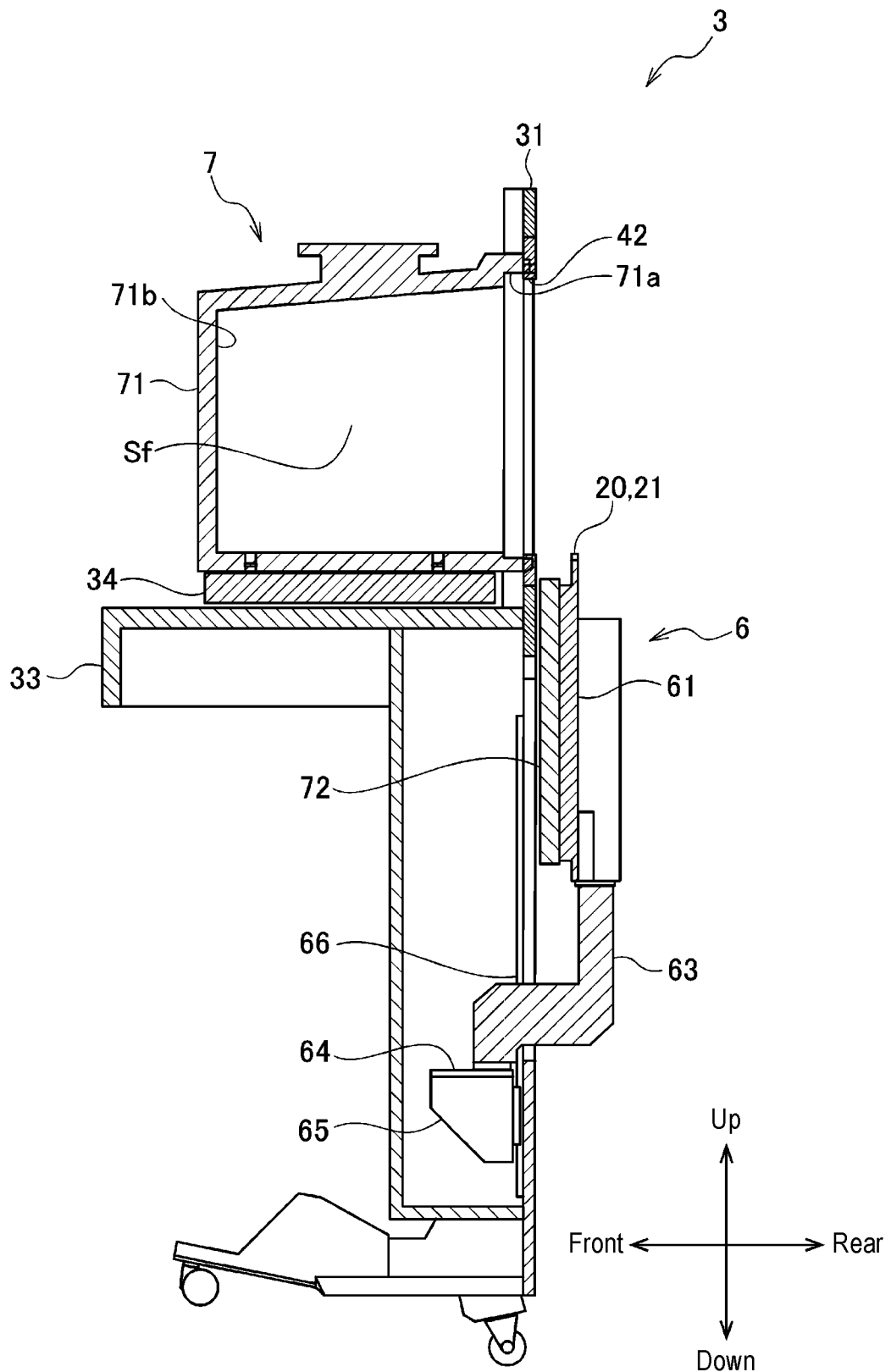
FIG. 2 is a side sectional view showing a state in which a door is moved downward together with a lid portion of a FOUP from the state shown in FIG. 1.

Then, as shown in FIG. 2, the door 61 is moved downward together with the support frame 63. By doing so, the rear side of the opening 71a serving as the loading/unloading port for the FOUP 7 can be largely opened, and the substrate can be moved between the FOUP 7 and the semiconductor manufacturing apparatus. The operation when opening the opening 71a of the FOUP 7 has been described above. When closing the opening 71a of the FOUP 7, the operation opposite to the above-described operation may be performed.

As shown in FIG. 3, two cameras 20 and 21 are fixed to the upper edge portion of the door 61 integrally with the door 61. Specifically, the right camera 20 is fixed at an approximately ⅓ position from the right edge of the upper edge of the door 61, and the left camera 21 is fixed near the left end of the upper edge portion of the door 61, for example, by known fastening means (not shown) or the like. Therefore, as shown in FIG. 1, when the door 61 closes the opening 42, i.e., when the opening 71a of the FOUP 7 is closed, the cameras 20 and 21 are arranged above the substrate accommodated at the uppermost position among the plurality of substrates accommodated in the FOUP 7.

Three poles P1 to P3 are fixed to the front wall surface 71b of the internal space Sf of the FOUP 7 so as to protrude rearward in the horizontal direction for each stage. Since one substrate B is supported by the three poles P1 to P3, a plurality of substrates B can be accommodated in multiple stages in the internal space Sf of the FOUP 7.

The right side pole P1 (hereinafter referred to as "right pole P1") is provided near the right wall surface 71c of the internal space Sf along the right wall surface 71c, and the left side pole P3 (hereinafter referred to as "left pole P3") is provided near the left wall surface 71d of the internal space Sf along the left wall surface 71d. The pole P2 located between the right pole P1 and the left pole P3 is provided approximately at the horizontal center of the front wall surface 71b. The pole P2 is hereinafter referred to as "central pole P2". The length of the right pole P1 is approximately the same as the length of the right wall surface 71c in the front-rear direction, and the length of the left pole P3 is approximately the same as the length of the left wall surface 71d in the front-rear direction. That is, the lengths of the right pole P1 and the left pole P3 are set to be substantially the same. On the other hand, the length of the central pole P2 is set to be shorter than the lengths of the right pole P1 and the left pole P3. This is to prevent the central pole P2 from interfering with the operation of a robot when the robot is used to load the substrate B into the FOUP 7 or unload the substrate from the FOUP 7.

The right camera 20 is a low-magnification camera with a wide horizontal angle of view (hereinafter referred to as "low-magnification camera"), and the left camera 21 is a high-magnification camera with a narrow horizontal angle of view (hereinafter referred to as "high-magnification camera"). As the low-magnification camera 20, a camera capable of imaging the region from the vicinity of the right pole P1 to the vicinity of the central pole P2 is adopted. As the high-magnification camera 21, a camera capable of imaging the vicinity of the left pole P3 is adopted. This allows the low-magnification camera 20 and the high-magnification camera 21 to image the range from the vicinity of the right pole P1 to the vicinity of the left pole P3. The reason why a camera with a narrow horizontal field of view is used as the high-magnification camera 21 is to reduce the manufacturing cost of the entire load port 3 by adopting an inexpensive camera with a high magnification. The specifications of the low-magnification camera 20 include, for example, a horizontal angle of view of 125° and a resolution of 1.2 million pixels, and the specifications of the high-magnification camera 21 include, for example, a horizontal angle of view of 32° and a resolution of 1.2 million pixels.

A pair of illumination lights 22 are fixed on both left and right sides of the low-magnification camera 20 fixed in the upper edge portion of the door 61. An illumination light 23 is fixed on the upper edge portion of the door 61 at a position including the high-magnification camera 21 in a plan view. In this embodiment, both the illumination lights 22 and the illumination light 23 are formed in a wide shape by using, for example, lights in which a plurality of LED elements are arranged in a line. The reason why the widths of the illumination lights 22 and the illumination light 23 are made different in this way is that the low-magnification camera 20 has a wide horizontal angle of view, which makes it necessary to illuminate a wide imaging area with the pair of wide illumination lights 22, whereas the high-magnification camera 21 has a narrow horizontal angle of view, which means that it is sufficient to illuminate a narrow imaging area with the narrow illumination light 23. As described above, in this embodiment, the illumination lights 22 and 23 formed in a wide shape using LED elements are adopted. However, the present disclosure is not limited thereto. It may also be possible to adopt illumination lights having a width in the vertical direction as well. When such illumination lights are adopted, it is possible to suppress as much as possible a situation where the light of the illumination lights is specularly reflected on the rear side end surface of the substrate B, which is a subject, and the reflected light from the rear side end surface is not directed toward the cameras 20 and 21, thereby making it impossible to detect the substrate B with the cameras 20 and 21.

The two cameras 20 and 21 are controlled by the controller 11 to image each substrate B accommodated in the FOUP 7 when the door 61 moves horizontally toward the rear side and then moves toward the lower side.

Figure 4:
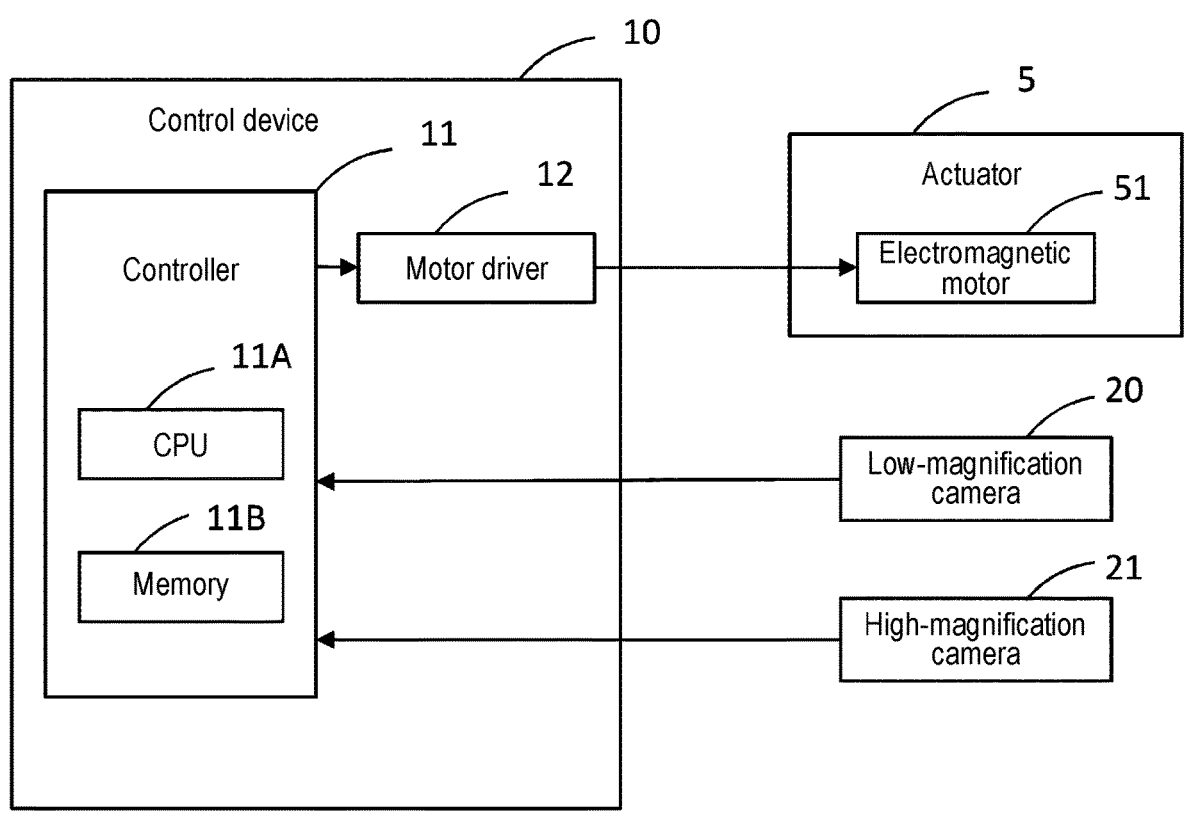
FIG. 4 is a block diagram showing a control configuration of a load port shown in in FIG. 1.

FIG. 4 shows the control configuration of the load port 3. The load port 3 includes a control device 10 which includes a controller 11 and a motor driver 12. The controller 11 is connected to the motor driver 12, and the motor driver 12 is connected to an electromagnetic motor 51 that constitutes the actuator 5. The controller 11 is also connected to the low-magnification camera 20 and the high-magnification camera 21.

The controller 11 includes a CPU 11A and a memory 11B. The memory 11B includes, for example, a RAM, a ROM, a flash memory, etc., and stores information related to control and processing. Further, the memory 11B stores a control program for executing various control processes including a substrate accommodation state determination process (see FIG. 5), which will be described later. The CPU 11A performs various controls on the load port 3 by executing various control programs stored in the memory 11B.

The controller 11 controls the electromagnetic motor 51 via the motor driver 12 in the process of performing various controls on the load port 3. In this embodiment, the electromagnetic motor 51 is used as a power source when the actuator 5 moves the door 61 in the vertical direction. For example, when a stepping motor is used as the electromagnetic motor 51, the controller 11 supplies pulse signals to the motor driver 12. The motor driver 12 controls the rotary shaft of the stepping motor so that the rotation angle corresponds to the number of pulses of the inputted pulse signals. Therefore, the controller 11 can indirectly know the current vertical position of the door 61 by integrating the number of pulses of the pulse signals supplied to the motor driver 12 (including the integration of negative values). As a result, the controller 11 can also know the current positions of the cameras 20 and 21, so that the cameras 20 and 21 can perform imaging at any position from the fully closed state to the fully open state of the opening 42 opened and closed by the door 61.

Imaging data obtained through imaging by the cameras 20 and 21 is transmitted from the cameras 20 and 21 to the controller 11. The controller 11 temporarily stores the imaging data received from the cameras 20 and 21 in the memory 11B. Then, the controller 11 performs image processing on the imaging data stored in the memory 11B, and determines whether or not each substrate B accommodated in each stage undergoes an accommodation abnormality. In this embodiment, the accommodation abnormality means a state in which the substrate B is not accommodated (hereinafter referred to as an "empty state") in addition to the above-mentioned doubled state and the above-mentioned crossed state. The empty state may not be determined as an accommodation abnormality, but the empty state may be recorded.

Figure 5:
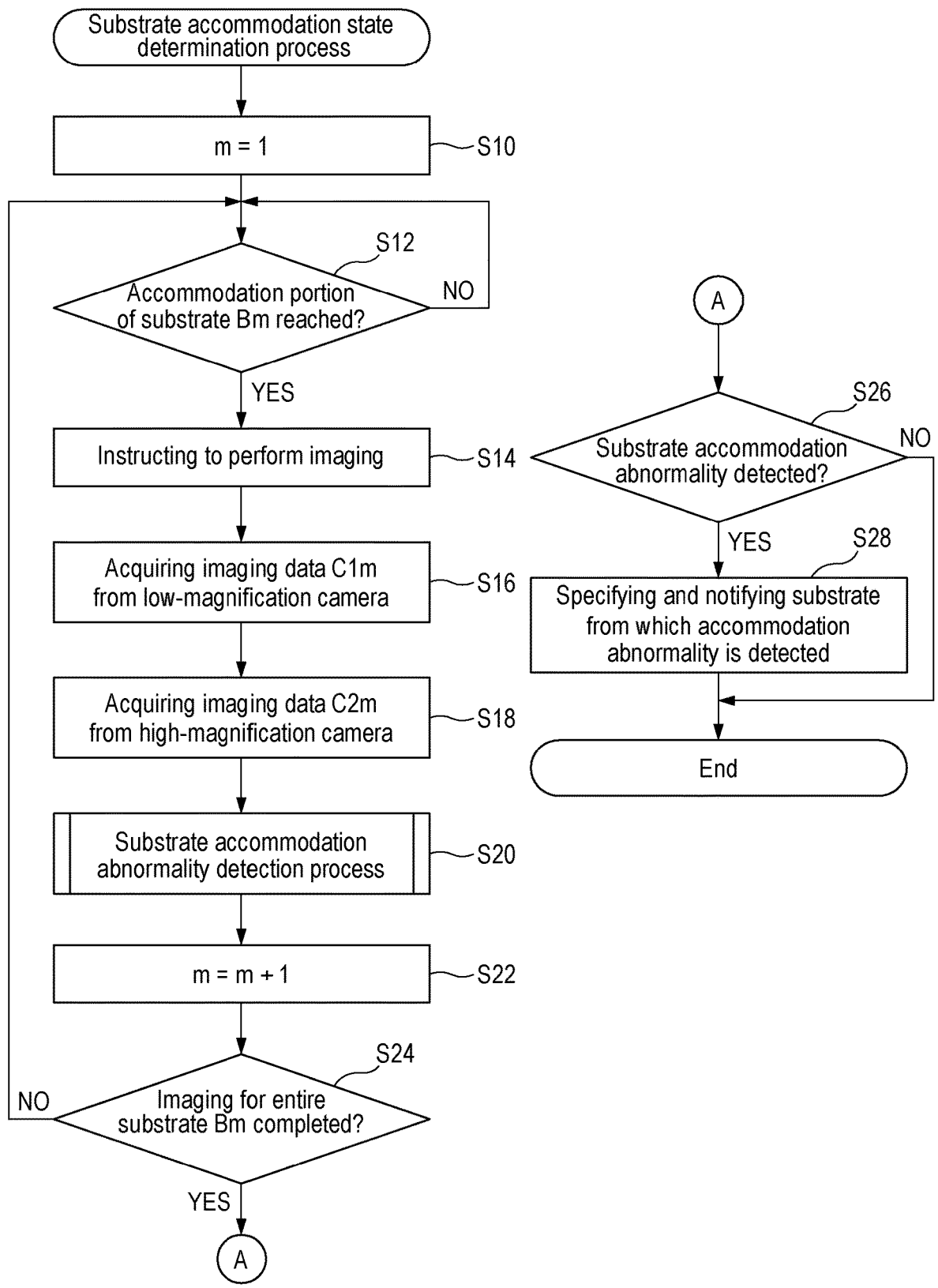
FIG. 5 is a flowchart showing a procedure of a substrate accommodation state determination process executed by a controller shown in FIG. 4, particularly by a CPU.

The control process executed by the load port 3 configured as described above will be described in detail with reference to FIGS. 5 to 8. FIG. 5 shows a procedure of a substrate accommodation state determination process executed by the controller 11, particularly by the CPU 11A. The substrate accommodation state determination process is started at a timing such as before the substrate B is transferred from the FOUP 7. In the following description of the procedure of each process, a step is denoted by "S".

In FIG. 5, the CPU 11A first sets a counter m for counting the substrates B accommodated in the FOUP 7 stage by stage from the top to an initial value "1" (S10).

Next, the CPU 11A determines whether an imaging position of the camera 20 is reached to the accommodation position of a substrate Bm (S12). As used herein, the accommodation position of the substrate Bm refers to a position where the substrate Bm is accommodated when the three poles P1 to P3 are attached to a designed mounting position. When the thickness of the substrate Bm is very small, the accommodation position of the substrate Bm and the designed mounting position of the three poles P1 to P3 are approximately equivalent. Therefore, the determination in S12 is almost the same as determining whether the $m^{th}$-stage designed mounting position of the poles P1 to P3 is reached.

In the determination of S12, if the imaging position of the camera 20 has not yet reached the accommodation position of the substrate Bm (S12: NO), the camera 20 waits until the imaging position of the camera 20 has reached the accommodation position of the substrate Bm. If the imaging position of the camera 20 has reached the accommodation position of the substrate Bm (S12: YES), the CPU 11A instructs the cameras 20 and 21 to perform imaging at that position (S14).

Then, the CPU 11A acquires imaging data C1m obtained through imaging by the low-magnification camera 20 (S16), and temporarily stores the imaging data in the memory 11B, for example. Similarly, the CPU 11A acquires imaging data C2m obtained through imaging by the high-magnification camera 21 (S18), and temporarily stores the imaging data in the memory 11B, for example.

Figure 6:
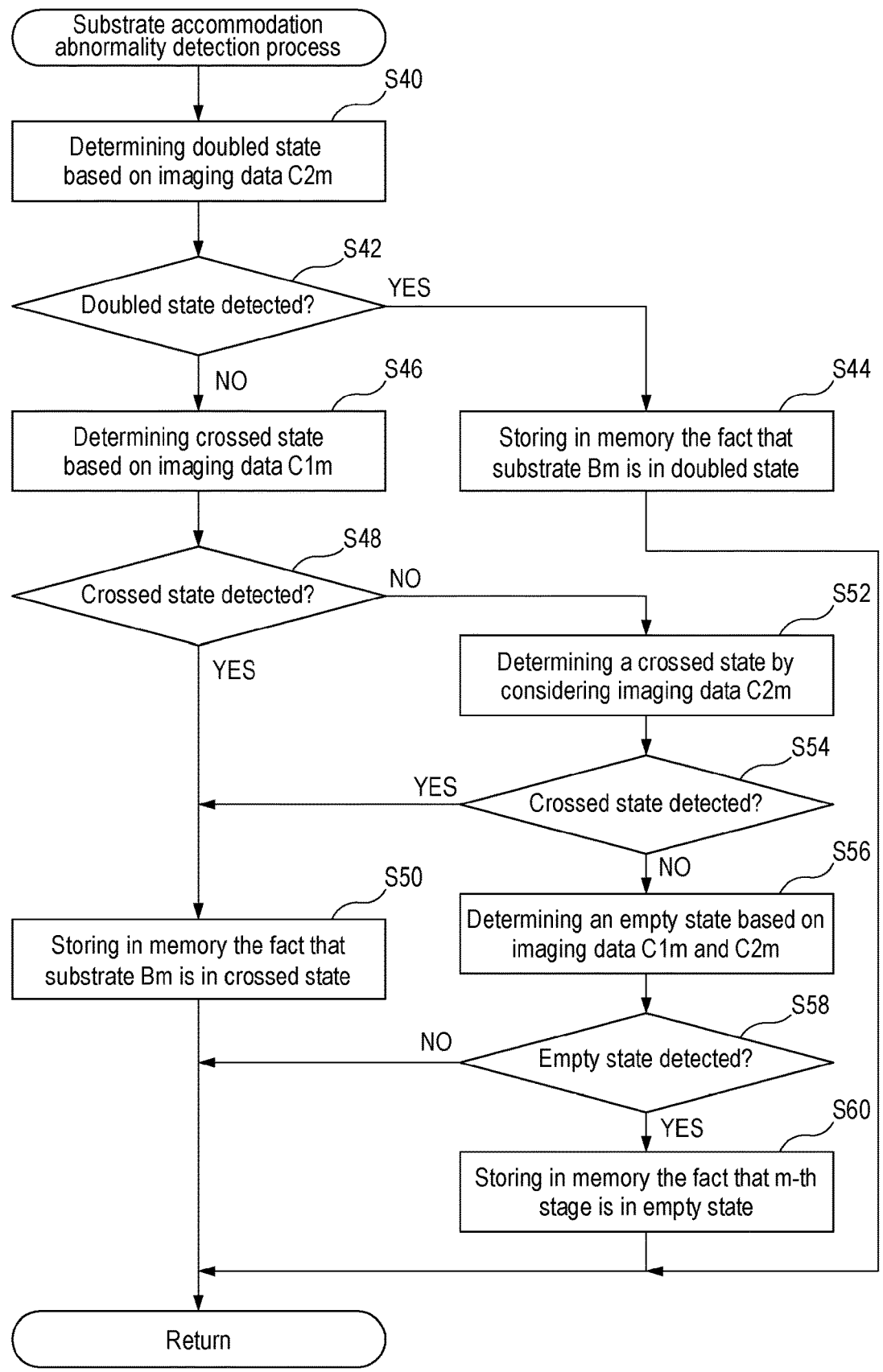
FIG. 6 is a flowchart showing a detailed procedure of a substrate accommodation abnormality detection process included in the substrate accommodation state determination process shown in FIG. 5.

Next, the CPU 11A executes a substrate accommodation abnormality detection process (S20). FIG. 6 shows the detailed procedure of the substrate accommodation abnormality detection process. In FIG. 6, the CPU 11A first determines a doubled state from the imaging data C2m (S40).

FIGS. 7A, 7B and 7C show examples in which the substrate is accommodated in an abnormal state. FIG. 7A shows that a substrate B02 is accommodated on a substrate B01 in an overlapping state, i.e., in a doubled state. FIG. 7B shows that a substrate B1 is accommodated in a state in which the right end of the substrate B1 is placed below the right pole P1, i.e., in a crossed state. FIG. 7C shows that a substrate B2 is accommodated in a state in which the left end of the substrate B2 is located below the left pole P3, i.e., in a crossed state.

In FIGS. 7A, 7B and 7C, the region 200 indicates an imaging region of the low-magnification camera 20, and the region 210 indicates an imaging region of the high-magnification camera 21. Hereinafter, the region 200 will be referred to as a "first imaging region 200", and the region 210 will be referred to as a "second imaging region 210". In addition, the first imaging region 200 includes a first detection region 201 which is a region for detecting whether the substrate B is located above or below the right pole P1, i.e., a crossed state, and a second detection region 202 which is a region for detecting whether the substrate B is located above or below the central pole P2, i.e., a crossed state. Further, a third detection region 211 is also provided in the second imaging region 210. The third detection region 211 is mainly used to detect that the substrates B are accommodated in a doubled state. However, if the crossed state cannot be detected by the first detection region 201 and the second detection region 202, the third detection region 211 is used to detect the crossed state.

In the determination in S40, the CPU 11A detects the thickness of the substrate Bm from the partial data included in the third detection region 211 among the imaging data C2m. If the detected thickness of the substrate Bm exceeds the thickness of one substrate B, the CPU 11A determines that the substrate Bm is in a doubled state. On the other hand, if the detected thickness of the substrate Bm is substantially equal to the thickness of one substrate B, the CPU 11A determines that the substrate B is not in a doubled state. Since FIG. 7A shows a state in which a substrate B02 is overlapped with a substrate B01 as described above, if the imaging data C2m is obtained by imaging the substrates B01 and B02 shown in FIG. 7A, the CPU 11A determines that the substrates B01 and B02 are in a doubled state.

Next, the CPU 11A determines whether or not a doubled state is detected (S42). In this determination, if the doubled state is detected (S42: YES), the CPU 11A stores in the memory 11B the fact that the substrate Bm is in the doubled state (S44), and then terminates the substrate accommodation abnormality detection process. On the other hand, in the determination of S42, if the doubled state is not detected (S42: NO), the CPU 11A determines a crossed state from the imaging data C1m (S46). Specifically, the CPU 11A detects whether the substrate Bm is positioned above or below the right pole P1 from the partial data included in the first detection region 201 among the imaging data C1m. For example, the CPU 11A may compare the position of the right pole P1 (which is a known designed position) acquired in advance with the position of the substrate Bm detected from the partial data included in the first detection region 201 to detect whether the substrate Bm is located above or below the right pole P1. If it is detected through this detection that the substrate B is located below the right pole P1, the CPU 11A determines that the substrate Bm is in a crossed state. In FIG. 7B, since the substrate B1 is located below the right pole P1 as described above, if the imaging data C1m is obtained by imaging the substrate B1 shown in FIG. 7B, the CPU 11A determines that the substrate B1 is in a crossed state. Since a tolerance is allowed for the position of each of the poles P1 to P3, a deviation may occur between the designed position and the actual position of each of the poles P1 to P3. In this case, the actual position of each of the poles P1 to P3 may be detected by pattern matching, for example.

On the other hand, when the CPU 11A detects that the substrate Bm is located above the right pole P1 from the partial data included in the first detection region 201 among the imaging data C1m, the CPU 11A further detects whether the substrate Bm is located above or below the central pole P2 from the partial data included in the second detection region 202 among the imaging data C1m. If it is detected through this detection that the substrate B is located below the central pole P2, the CPU 11A determines that the substrate Bm is in a crossed state.

Next, the CPU 11A determines whether a crossed state is detected (S48). In this determination, if the crossed state is detected (S48: YES), the CPU 11A stores in the memory 11B the fact that the substrate Bm is in the crossed state (S50), and then terminates the substrate accommodation abnormality detection process. On the other hand, in the determination of S48, if the crossed state is not detected (S48: NO), the CPU 11A also considers imaging data C2m to determine the crossed state (S52). Specifically, the CPU 11A detects whether the substrate Bm is located above or below the left pole P3 from the partial data included in the third detection region 211 among the imaging data C2m. When it is detected by this detection that the substrate B is located below the left pole P3, the CPU 11A determines that the substrate Bm is in a crossed state. In FIG. 7C, the substrate B2 is located below the left pole P3 as described above. Therefore, the CPU 11A determines that the substrate B2 is in a crossed state.

Next, the CPU 11A determines whether or not a crossed state is detected (S54). In this determination, if the crossed state is detected (S54: YES), the CPU 11A allows the process to advance to S50, stores in the memory 11B the fact that the substrate Bm is in the crossed state, and then terminates the substrate accommodation abnormality detection process. On the other hand, if the crossed state is not detected in the determination of S54 (S54: NO), the CPU 11A determines the empty state from the imaging data C1m and C2m. Specifically, the CPU 11A determines whether or not the substrate Bm is captured in the partial data included in the first detection region 201 and the second detection region 202, respectively, among the imaging data C1m, and also determines whether or not the substrate Bm is captured in the partial data included in the third detection region 203, among the imaging data C2m. If the substrate Bm is not captured in any of the partial data included in each of the first to third detection regions 201, 202 and 211, the CPU 11A determines that it is an empty state.

Next, the CPU 11A determines whether or not an empty state is detected (S58). In this determination, if the empty state is detected (S58: YES), the CPU 11A stores in the memory 11B the fact that the m-th stage is empty (S60), and then terminates the substrate accommodation abnormality detection process. On the other hand, in the determination of S58, if the empty state is not detected (S58: NO), the CPU 11A terminates the substrate accommodation abnormality detection process.

Returning to FIG. 5, after incrementing the count value of the counter m by "1" (S22), the CPU 11A determines whether the imaging for all the substrates Bm accommodated in the FOUP 7 is completed (S24). In this determination, if there is still a substrate B to be imaged (S24: NO), the CPU 11A returns the process to S12 and repeats the process from S12 onwards. On the other hand, if the imaging for all the substrates Bm is completed (S24: YES), the CPU 11A allows the process to advance to S26.

In S26, the CPU 11A determines whether or not a substrate accommodation abnormality is detected. Specifically, if any one of the doubled state, the crossed state and the empty state is stored in the memory 11B, the CPU 11A determines that an accommodation abnormality for the substrate B has been detected. If any one of the doubled state, the crossed state and the empty state is not stored in the memory 11B, the CPU 11A determines that an accommodation abnormality for the substrate B has not been detected. In the determination of S26, if a substrate accommodation abnormality is detected (S26: YES), the CPU 11A specifies and notifies the substrate for which the accommodation abnormality has been detected (this substrate is stored in the memory 11B together with the type of accommodation abnormality) (S28), and then terminates the substrate accommodation state determination process. If the load port 3 is equipped with a display (not shown), the notification may be displayed on the display. If the load port 3 is equipped with a voice function, the notification may also be delivered in the form of voice by using the voice function. In short, the notification may be performed in any type as long as it can be delivered to the operator of the load port 3.

On the other hand, if it is determined in S26 that no substrate accommodation abnormality is detected (S26: NO), the CPU 11A terminates the substrate accommodation state determination process.

Figure 8:
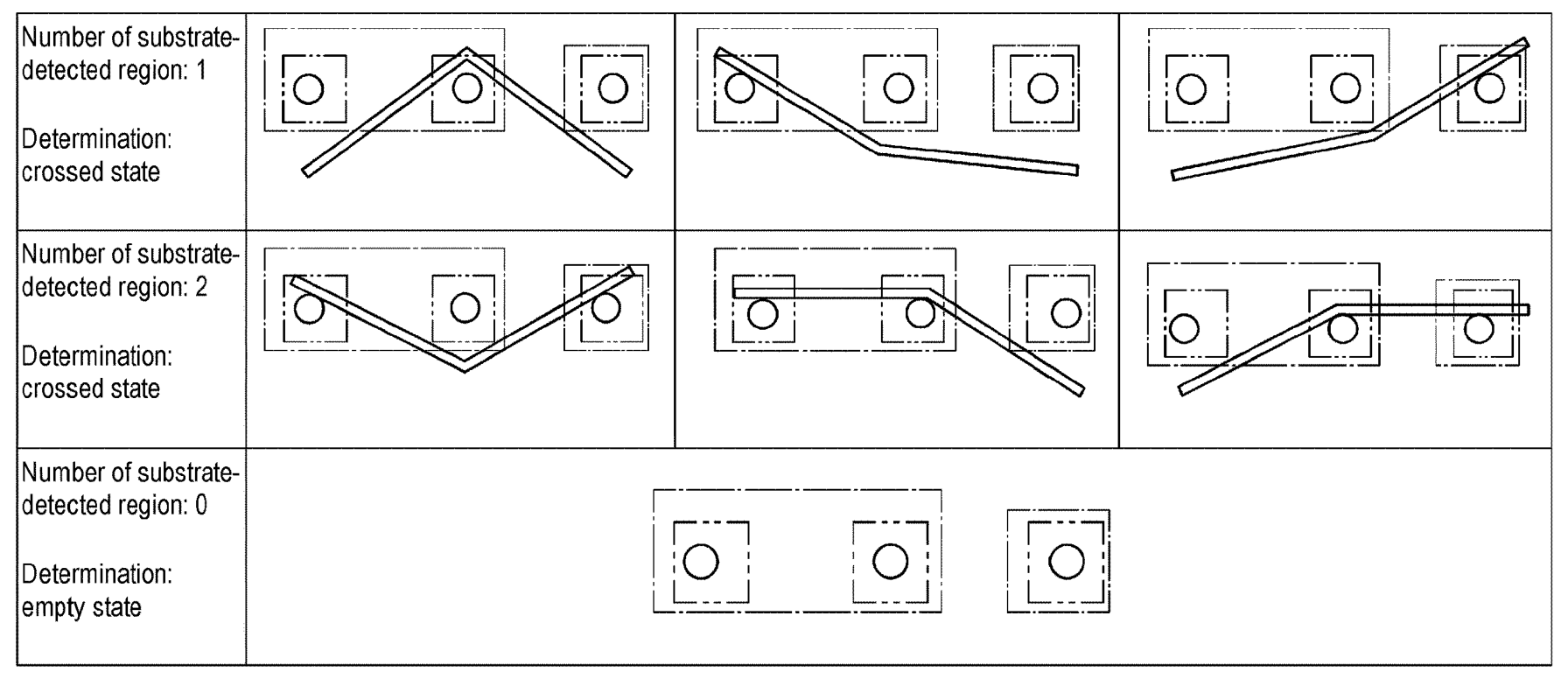

In each of the examples shown in FIGS. 7A to 7C, the substrate B can be detected from the partial data included in the first to third detection regions 201, 202 and 211. Therefore, it is possible to clearly determine whether the substrate B is accommodated in the FOUP 7 in an abnormal state or in a normal state. However, depending on the material of the substrate B, if the substrate B is accommodated in a crossed state, the substrate B may be bent largely, and the rear end surface of the substrate B, which is a subject, may be located outside any two regions or one region among the first to third detection regions 201, 202 and 211. FIG. 8 shows an example in which the crossed state is determined in a state where the substrate B is largely bent. In the three examples shown in the top row of FIG. 8, the rear end surface of the substrate B is detected only in one of the first to third detection regions 201, 202 and 211, and the rear end surface of substrate B is not detected in the other two regions. In these three examples, the positional relationship with any one of the three poles P1 to P3 in one region where the rear end surface of the substrate B is detected is such that the rear end surface of the substrate B is located on the upper side. Therefore, a crossed state can be determined.

Further, in the three examples shown in the second row in FIG. 8, the rear end surface of the substrate B is detected only in two of the first to third detection regions 201, 202 and 211, and the rear end surface of substrate B is not detected in the remaining one region. In these three examples, the positional relationship with any two of the three poles P1 to P3 in two regions where the rear end surface of the substrate B is detected is such that the rear end surface of the substrate B is located on the upper side. Therefore, a crossed state can be determined.

Furthermore, in one example shown in the bottom row in FIG. 8, the rear end surface of the substrate B is not detected in any one of the first to third detection regions 201, 202 and 211. In this example, an empty state is determined.

The method of determining the crossed state described above is a first determination method performed depending on whether the rear end surface of the substrate B is located on the upper side or the lower side of the three poles P1 to P3. In addition, a second determination method and a third determination method may be used.

The second determination method is configured to detect a difference between the position of the rear end surface of the substrate B in a correctly accommodated state and the position of the rear end surface of the substrate B in a crossed state, and to determine the crossed state based on this difference. This is because the rear end surface of the substrate B is different between the properly accommodated state and the crossed state, and this difference is used to determine a normal state and a crossed state.

The third determination method is configured to determine a crossed state based on the number of regions in which the rear end surface of the substrate B is detected among the first to third detection region 201, 202 and 211. When the substrate B is accommodated in a crossed state (when the substrate B is misplaced on at least one of the three poles P1 to P3), the position (height) of the rear end surface of the substrate B near the pole misplaced from the imaging position is different. At this time, depending on the material of the substrate B, the light from the illumination lights 22 and 23 is specularly reflected at the rear end surface. Thus, the reflected light from the rear end surface may not be directed to the cameras 20 and 21 and the substrate B may not be detected. Therefore, even if the crossed state is determined by the first determination method and the second determination method, the crossed state cannot be determined because the substrate B itself cannot be detected. Since the positions where the cameras 20 and 21 and the illumination lights 22 and 23 can be installed are limited by design, there are limits in the countermeasures for the installation configuration such as extending the illumination lights 22 and 23 downward so that the reflected light from the rear end surface of the substrate B is directed toward the cameras 20 and 21.

When the substrate B is accommodated in a crossed state, the substrate B is correctly installed on at least one of the three poles P1 to P3. Since there is little change in the position of the rear end surface of the substrate B in the vicinity of the pole, the substrate B can be detected in at least one detection region among the first to third detection regions 201, 202 and 211. Therefore, if there is a detection region in which the substrate B cannot be detected by the first determination method or the second determination method, the crossed state is determined using the third determination method.

In the third determination method, when the substrate B can be detected in one or two detection regions among the first to third detection regions 201, 202 and 211, it can be determined as a crossed state. If the number of detection regions is 0, the relevant stage is determined to be in an empty state. However, with the third determination method, it is not possible to determine whether or not the substrate is normally accommodated (if the substrate is normally accommodated, it has already been determined by the first determination method or the second determination method). Even if the position of the rear end surface of the substrate B is out of the detection region due to the crossed state, the crossed state can be determined by the same method.

As described above, the load port 3 of the present embodiment includes a FOUP 7 configured to accommodate a plurality of substrates Bm in multiple stages, cameras 20 and 21 configured to image each of the substrates Bm accommodated in the FOUP 7 and including a low-magnification camera 20 with a wide horizontal angle of view and a high-magnification camera 21 with a narrow horizontal angle of view, and a CPU 11A configured to detect the accommodation state of each of the substrates Bm based on the imaging data C1m and the imaging data C2m acquired from the low-magnification camera 20 and the high-magnification camera 21, respectively.

As described above, the load port 3 of this embodiment includes the low-magnification camera 20 with a wide horizontal angle of view and the high-magnification camera 21 with a narrow horizontal angle of view. The accommodation state of each of the substrates Bm is detected based on the imaging data C1m and the imaging data C2m acquired from the low-magnification camera 20 and the high-magnification camera 21, respectively. Therefore, it is possible to detect the accommodation states, i.e., the doubled state and the crossed state while reducing manufacturing costs.

Incidentally, in this embodiment, the load port 3 is an example of a "mapping device." The FOUP 7 is an example of a "container." The cameras 20 and 21 are examples of "imaging devices." The low-magnification camera 20 is an example of a "first imaging device." The high-magnification camera 21 is an example of a "second imaging device." The imaging data C1m is an example of "first imaging data." The imaging data C2m is an example of "second imaging data." The CPU 11A is an example of a "controller."

Further, the cameras 20 and 21 are provided on the door 61 that moves up and down over the opening 42 of the FOUP 7 from a fully closed state to a fully open state.

Thus, the cameras 20 and 21 can be moved up and down in accordance with the up and down movement of opening and closing the door 61. Therefore, there is no need to provide a dedicated device for moving the cameras 20 and 21 up and down. Accordingly, it is possible to further reduce the manufacturing cost of the entire load port 3.

Further, the FOUP 7 has a plurality of poles P1 to P3 in each stage m, and the substrate Bm of each stage m is supported by the plurality of poles P1 to P3. The cameras 20 and 21 have a horizontal angle of view that can image the plurality of poles P1 to P3.

As a result, the cameras 20 and 21 can image the entire substrate Bm in each stage m supported by the plurality of poles P1 to P3. Therefore, it is possible to accurately detect the accommodation states, i.e., the doubled state and the crossed state.

Furthermore, the low-magnification camera 20 images the vicinity of the poles P1 and P2 excluding the outermost pole P3 among the plurality of poles P1 to P3, and the high-magnification camera 21 images the vicinity of the outermost pole P3.

Thus, an inexpensive camera with a high magnification and a narrow horizontal angle of view can be used as the high-magnification camera 21. This makes it possible to further suppress the manufacturing cost of the entire load port 3.

The present invention is not limited to the above embodiment, and various changes may be made without departing from the spirit thereof.

(1) In the above embodiment, the FOUP 7 is used as the container that accommodates the substrates B. However, other containers such as a FOSB (Front Opening Shipping Box) or an open cassette may be used.

(2) In the above embodiment, a stepping motor is taken as an example of the electromagnetic motor 51. However, the present disclosure is not limited thereto, and a servo motor may also be used. In this case, the current position of the door 61 in the vertical direction may be indirectly known based on the information acquired from an encoder. Furthermore, if a sensor or the like is provided that directly detects the current position of the door 61 in the vertical direction, the current positions of the cameras 20 and 21 may be calculated based on the output from the sensor.

Figure 9:
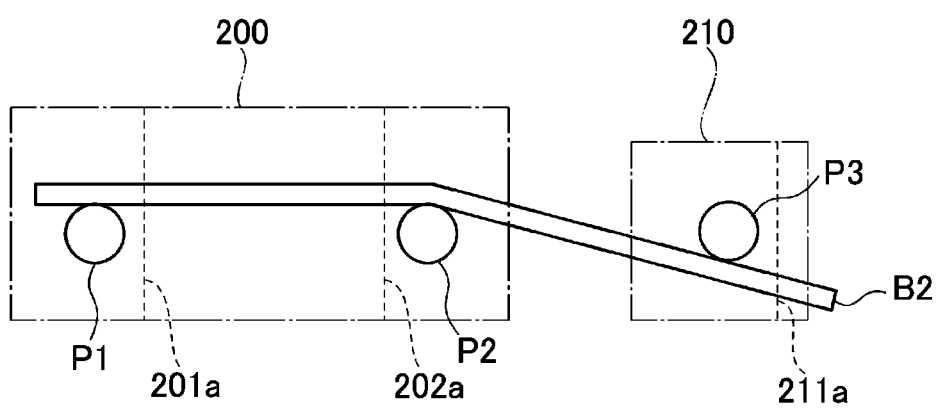
FIG. 9 is a view showing how the substrate accommodation state is determined using a substrate detection line instead of a substrate detection area.

(3) In the above embodiment, rectangular regions are adopted as the first to third detection regions 201, 202 and 211. However, the present disclosure is not limited thereto. A shown in FIG. 9, first to third detection lines 201a, 202a and 211a having a line shape may be employed to detect the positional relationship between the substrate B2 and the three poles P1 to P3.

(4) In the above embodiment, the number of poles is three. However, the number of poles is not limited thereto, and may be two or four or more.

(5) In the above embodiment, all the substrates B accommodated in the FOUP 7 have the same thickness. However, the present disclosure is not limited thereto. Substrates with various thicknesses (of, e.g., 0.2 to 3.2 mm) may be used. The thickness of the substrate may be changed through a processing process. In such a case, the ID of the FOUP may be read at the load port, the database of the host system or the like may be accessed to acquire the thickness data of the substrate in each slot of the FOUP, and the thickness data may be used as a threshold value for detection of a doubled state.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

EXPLANATION OF REFERENCE NUMERALS

3: load port, 5: actuator, 6: opening/closing mechanism, 7: FOUP, 10: control device, 11: controller, 11A: CPU, 11B: memory, 12: motor driver, 20, 21: camera, 20: low-magnification camera, 21: high-magnification camera, 51: electromagnetic motor, 61: door

What is claimed is:

1. A mapping device comprising:
a mounting table configured to mount a container that accommodates a plurality of substrates in multiple stages;
an imaging device configured to image each of the substrates accommodated in the container, and including a first imaging device and a second imaging device having a narrower horizontal angle of view and higher magnification than the first imaging device; and
a controller configured to detect an accommodation state of each of the substrates based on first imaging data and second imaging data acquired from the first imaging device and the second imaging device, respectively,
wherein the imaging device is configured to image each of the substrates from an opening of the container,
wherein the container has a plurality of poles provided in each stage and configured to support each of the substrates in each stage by the plurality of poles, and
wherein the imaging device has a horizontal angle of view capable of imaging the plurality of poles.

2. The mapping device of claim 1, wherein the imaging device is provided on a door that moves up and down over the opening of the container from a fully closed state to a fully open state.

3. The mapping device of claim 2, wherein the first imaging device is configured to image a vicinity of the plurality of poles except for one pole located at an outermost position, and
wherein the second imaging device is configured to image a vicinity of the one pole located at the outermost position.

4. A mapping device comprising:
a mounting table configured to mount a container that accommodates a plurality of substrates in multiple stages;
an imaging device configured to image each of the substrates accommodated in the container, and including a first imaging device and a second imaging device having a narrower horizontal angle of view and higher magnification than the first imaging device; and
a controller configured to detect an accommodation state of each of the substrates based on first imaging data and second imaging data acquired from the first imaging device and the second imaging device, respectively,
wherein the container has a plurality of poles provided in each stage and configured to support each of the substrates in each stage by the plurality of poles,
wherein the imaging device has a horizontal angle of view capable of imaging the plurality of poles,
wherein the first imaging device is configured to image a vicinity of the plurality of poles except for one pole located at an outermost position, and
wherein the second imaging device is configured to image a vicinity of the one pole located at the outermost position.

5. A substrate accommodation state determination method in which a substrate accommodated in a container is imaged by a first imaging device and a second imaging device to determine an accommodation state of the substrate, the first imaging device configured to image a first region, the second imaging device configured to image a second region narrower than the first region at a higher magnification than the first imaging device, the method comprising:
a first state detection step of detecting a crossed state of the substrate existing in the first region based on a data acquired by the first imaging device;
a second state detection step of detecting a crossed state of the substrate existing in the second region and a thickness of the substrate based on a data acquired by the second imaging device; and
an accommodation state determination step of determining an accommodation state of the substrate based on detection results of the first state detection step and the second state detection step,
wherein the first imaging device and the second imaging device are configured to image the substrate from an opening of the container.

6. The mapping device of claim 1, wherein the first imaging device images a plurality of detection regions arranged along a horizontal direction.

7. The method of claim 5, wherein the first imaging device images a plurality of detection regions arranged along a horizontal direction.

* * * * *